No. 862,373. PATENTED AUG. 6, 1907.
J. F. APPLEBY.
COTTON PICKING MACHINE.
APPLICATION FILED DEC. 7, 1906.

Witnesses:

Inventor:
John F. Appleby,
By G. L. Crogg
Atty

UNITED STATES PATENT OFFICE.

JOHN F. APPLEBY, OF CHICAGO, ILLINOIS.

COTTON-PICKING MACHINE.

No. 862,873.  Specification of Letters Patent.  Patented Aug. 6, 1907.

Application filed December 7, 1906. Serial No. 346,758.

*To all whom it may concern:*

Be it known that I, JOHN F. APPLEBY, a citizen of the United States, residing at Chicago, in the county of Cook and State of Illinois, have invented a certain new and useful Improvement in Cotton-Picking Machines, of which the following is a full, clear, concise, and exact description, reference being had to the accompanying drawings, forming a part of this specification.

My invention relates to cotton picking machines, and has for its object an improvement in the construction of the picking spindles thereof.

Difficulty has hitherto been experienced in the operation of cotton picking machines, because of the liability of bending the cotton picking spindles, due to those characteristics of cotton picking spindles as they existed prior to my present invention. The picking spindles, when they are bent, even though the bending may be very slight, occasion poor operation of the machine, internal portions of the machine being liable to injury and destruction, which injury and destruction I have personally witnessed. This most serious difficulty I have obviated by so making the picking spindles, that they will break before yielding to bending strains. In the preferred embodiment of the invention, I localize the places upon the picking spindles where this breakage is to occur, the construction being preferably such that the breaking of the spindles will occur at the base portions thereof where the bearings therefor are provided.

In practicing my invention, I secure the desired results by making the spindles of steel and sufficiently hardening the same so that they will break before bending in the operation of the picking machine. In order that the locality of the fracture may be predetermined, the spindle is made hardest where such fracture is to occur, and in order more minutely to determine the exact locality of fracture, the spindles are desirably provided with weakening lines, peripherally disposed, along which the fractures are to occur.

As a further feature of my invention, I so organize and treat the spindles that the hardening need not be uniform throughout the lengths of the spindles, but, on the contrary, the temper may be sufficiently drawn at those portions where the fracture is not to occur, to permit the spindles to have other desired characteristics, while forcing the breakage before they are bent in the operation of the picking machine.

I prefer the class of cotton picking spindles illustrated by the accompanying drawing, but I do not wish to be limited to the spindles there shown.

Figure 1:
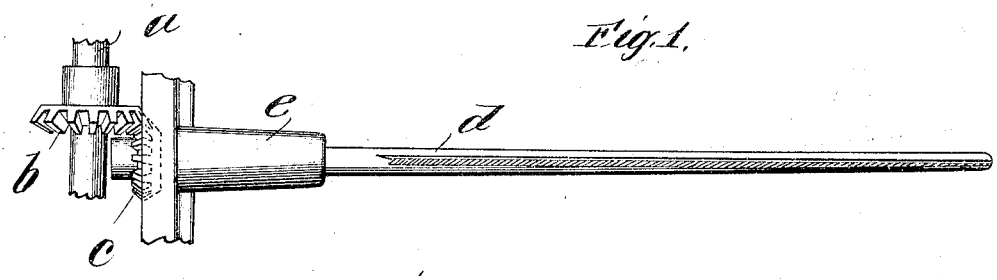
Figure 2:
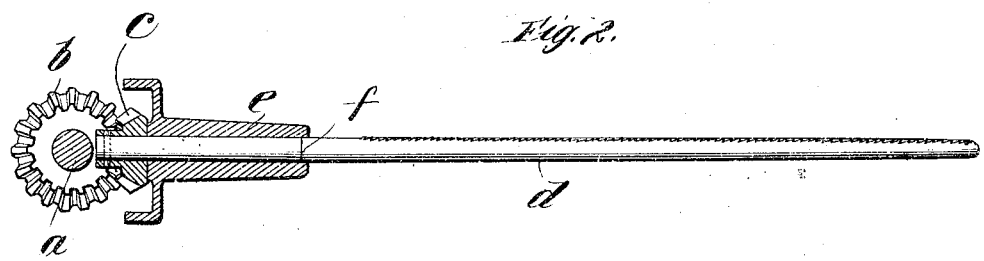

In the drawing—Figure 1 is a full view of a cotton picking spindle disposed in its bearing and geared to a driving shaft. Fig. 2 illustrates the same picking spindle at right angles to the direction in which Fig. 1 is taken, the bearing for the spindle and the gear mounted upon the base end of the spindle being shown in section.

Like parts are indicated by similar characters of reference throughout the different figures.

Any suitable form of mechanism may be employed for operating the spindles. In the embodiment of the invention shown, I have illustrated a driving shaft $a$, which carries a plurality of gears, one of such gears, $b$, being shown. The gear $b$ is in mesh with a gear $c$ that is fixed upon the base end of the picking spindle $d$. The base portion of the picking spindle is made smooth and is disposed within a journal $e$. The spindle is made sufficiently hard so that it will break before it bends in the operation of the cotton picking machine, whereby injury to and destruction of working parts of the machine is avoided. In order to eliminate the possibility of a bend in the spindle, I make the spindle especially hard at a selected place, which place is preferably near the bearing $e$, and, in order very definitely to define the locality of the fracture, I weaken the structure of the spindle where the fracture is to occur, which weakening is desirably accomplished by means of a line placed at $f$, which line desirably extends around the spindle. The hardening at the bearing also constitutes a weakening of the spindle for the purpose specified.

By the expressions "before yielding to bending strains", "becomes bent", and "before bending" I, of course, have reference to an alteration in the set of the spindle, it being the object of my invention to have the spindle break before it will sufficiently yield to bending strains as to remain bent. This meaning is apparent from the preamble to this specification.

Having thus described my invention, I claim as new and desire to secure by Letters-Patent:—

1. In a cotton picking machine, a cotton picking spindle, a bearing therefor, and means for operating the spindle, said spindle being hardened substantially throughout its length and being more hardened at the bearing in order to break there before it will become bent.

2. In a cotton picking machine, a cotton picking spindle, a bearing therefor, and means for operating the spindle, said spindle being hardened substantially throughout its length and being more hardened at a selected place, in order to break there before it will become bent.

3. In a cotton picking machine, a cotton picking spindle, a bearing therefor, and means for operating the spindle, said spindle being particularly hardened at the bearing to break there before it becomes bent.

4. In a cotton picking machine, a cotton picking spindle, a bearing therefor, and means for operating the spindle, said spindle being particularly hardened at a selected portion thereof, in order to break there before it becomes bent.

5. In a cotton picking machine, a cotton picking spindle, a bearing therefor, and means for operating the spindle, said spindle being hardened substantially throughout its length and weakened at the bearing to break there before it becomes bent.

6. In a cotton picking machine, a cotton picking spindle, a bearing therefor, and means for operating the spindle, said spindle being hardened substantially throughout its length and weakened at a predetermined place where the spindle will break before it becomes bent.

7. In a cotton picking machine, a cotton picking spindle, a bearing therefor, and means for operating the spindle, said spindle being weakened at the bearing and constituted to break where weakened before it bends.

8. In a cotton picking machine, a cotton picking spindle, a bearing therefor, and means for operating the spindle, said spindle being weakened and constituted to break where weakened before it becomes bent.

9. In a cotton picking machine, a cotton picking spindle, a bearing therefor, and means for operating the spindle, said spindle being constituted to break before it becomes bent and made more liable to fracture at the bearing.

10. In a cotton picking machine, a cotton picking spindle, a bearing therefor, and means for operating the spindle, said spindle being constituted to break before it becomes bent and made more liable to fracture at a predetermined location.

In witness whereof, I hereunto subscribe my name this 4th day of November A. D., 1906.

JOHN F. APPLEBY.

Witnesses:
G. L. CRAGG,
LEON G. STUH.